US012695358B2

(12) United States Patent
Schemmer et al.

(10) Patent No.: US 12,695,358 B2
(45) Date of Patent: Jul. 28, 2026

(54) AIR-COOLING SYSTEM FOR VERTICAL ROTARY ELECTRIC MACHINES, DEDICATED VENTILATION BOX, AND CORRESPONDING VERTICAL ROTARY ELECTRIC MACHINE

(71) Applicant: WEG EQUIPAMENTOS ELÉTRICOS S.A., Jaragua Do Sul (BR)

(72) Inventors: Leandro Schemmer, Jaragua Do Sul (BR); Rafael Fernando Junckes, Jaragua Do Sul (BR); Roberto Hardt, Jaragua Do Sul (BR)

(73) Assignee: WEG EQUIPAMENTOS ELÉTRICOS S.A. (BR)

( * ) Notice: Subject to any disclaimer, the term of this patent is extended or adjusted under 35 U.S.C. 154(b) by 85 days.

(21) Appl. No.: 18/314,698

(22) PCT Filed: Nov. 10, 2020

(86) PCT No.: PCT/BR2020/050467
§ 371 (c)(1),
(2) Date: May 9, 2023

(87) PCT Pub. No.: WO2022/099387
PCT Pub. Date: May 19, 2022

(65) Prior Publication Data
US 2024/0120804 A1 Apr. 11, 2024

(51) Int. Cl.
*H02K 9/04* (2006.01)
(52) U.S. Cl.
CPC ........... *H02K 9/04* (2013.01); *H02K 2213/12* (2013.01)

(58) Field of Classification Search
CPC .. H02K 9/00; H02K 9/04; H02K 9/06; H02K 9/10; H02K 9/12; H02K 9/16; H02K 9/18;
(Continued)

(56) References Cited

U.S. PATENT DOCUMENTS 4,348,604 A 9/1982 Thode
6,750,573 B1 * 6/2004 Schmidt .................. H02K 5/10
310/59

FOREIGN PATENT DOCUMENTS

CN 201466889 U 5/2010
CN 205178766 U 4/2016
(Continued)

OTHER PUBLICATIONS

International Search Report for International Application No. PCT/BR2020/050467, mailed Mar. 24, 2021, 7 pages.
(Continued)

*Primary Examiner* — Tran N Nguyen
(74) *Attorney, Agent, or Firm* — Lathrop GPM; Brian C. Trinque; Stephanie T. Vu

(57) ABSTRACT

The present invention relates to an air-cooling system for vertical rotary electric machines (200) comprising a one-piece, modular ventilation box (100) arranged separately and outside the vertical rotary electric machine (200) to form an upward-flow cooling circuit therewith, in which the internal space thereof is divided into an intake region (101) and an exhaust region (102). The intake region (101) comprises an air intake (111), at least one intake screen (113) and at least one intake opening (161), and the exhaust region (102) comprises at least one exhaust opening (162), at least one exhaust screen (153) and at least one air outlet (151).
(Continued)

The present invention also relates to a ventilation box (100) dedicated to cooling, and to a corresponding vertical rotary electric machine (200).

8 Claims, 6 Drawing Sheets

(58) Field of Classification Search
CPC .. H02K 9/26; H02K 9/28; H02K 5/00; H02K 5/10
See application file for complete search history.

(56) References Cited

FOREIGN PATENT DOCUMENTS

| | | | | |
|---|---|---|---|---|
| CN | 205231942 U | | 5/2016 | |
| CN | 108110954 A | * | 6/2018 | .............. H02K 9/12 |
| CN | 209030029 U | | 6/2019 | |
| JP | S5579651 A | | 6/1980 | |
| JP | 2000245108 A | | 9/2000 | |

OTHER PUBLICATIONS

Written Opinion for International Application No. PCT/BR2020/050467, mailed Mar. 24, 2021, 9 pages.

* cited by examiner

AIR-COOLING SYSTEM FOR VERTICAL ROTARY ELECTRIC MACHINES, DEDICATED VENTILATION BOX, AND CORRESPONDING VERTICAL ROTARY ELECTRIC MACHINE

FIELD OF APPLICATION

The present invention relates to the field of rotary electric machines, in particular arrangements for air-cooling or ventilating casings, housings, and supports of elements of rotary electric machines.

BACKGROUND OF THE INVENTION

Rotary electric machines or simply electric motors are equipment used to transform electrical energy into mechanical energy.

Rotary electric machines basically comprise four structures, which are housing, stator, rotor, and bearings/caps. In addition to these elements, depending on the different characteristics of each rotary electric machine, there may also be auxiliary systems such as cooling, lubrication, and excitation, among others.

The housing is the element responsible for integrating the structures, housing the stator and rotor, as well as any auxiliary systems.

The stator is the active (energized) static component responsible for conducting the magnetic flux to rotate the rotor.

In the case of three-phase induction machines, the rotor is the reactive, rotating component of the rotary electric machine.

The bearings and caps are the elements responsible for coupling the static parts to the rotating parts of a rotary electric machine, performing, for example, the coupling, bearing, and centering of the (rotating) rotor in relation to the (static) stator.

On the other hand, systems dedicated to air cooling electric machines commonly have one or more fans that capture air at ambient temperature from the electric machine's external surroundings, and are associated with passages, channels or deflectors of the housing or further associated with external ventilation boxes, which make said air pass through the electric machine, promoting heat exchange and removing part of the heat generated during the operation.

In addition to the normal heating for the operation of a rotary electric machine, some applications expose, in particular the vertical electric machine, to high axial forces resulting from, for example, hydraulic loads or mechanical loads and/or radial forces, such as, for example, the rotor's own weight and the like. Thus, rotary electric machines demand highly efficient cooling solutions to withstand the heating resulting from their operation.

Given that the heat exchange in air-cooled electric machines increases according to the temperature difference and the volume of air moved, cooling presents challenges and imposes limits on electric motor builders around the world that go beyond the limitations of size and potency.

The restrictions also include the degree of protection and noise attenuation, since insulating against impurities, bad weather, and noise goes directly against the heat exchange between the electric machine and its surroundings, demanding a relationship between the variables that not always fully satisfies design requirements.

BACKGROUND ART

In the prior art, there are several solutions that describe ventilation systems for vertical rotary electric machines of the nature discussed herein.

An example is patent document CN205231942, entitled "VERTICAL MACHINE COOLING STRUCTURE AND VERTICAL MACHINE", which discloses and describes a vertical machine cooling structure that, as described in independent claim 1, has a housing equipped with an air inlet and an air outlet, wherein one cover plate and two cover panels are respectively connected to the housing above the air inlet and outlet openings.

The main disadvantage of the solution proposed by CN205231942 is, without a doubt, the fact that the intake of cooling air takes place at the upper part and the exhaust thereof takes place at the lower part of the electric machine, since cold air, which is denser than warm air, will naturally be in the lower region of the electric machine, i.e., in this traditional circuit the air flows downward and, thus, against the movement of warm air, which naturally tends to rise, promoting the recirculation of the air already exhausted, i.e., the intake of air already heated by the motor. This phenomenon is undesirable since the intake (recirculation) of already heated air considerably reduces the heat exchange efficiency of the machine and, in extreme cases, can lead to overheating of the winding.

The cooling circuit of CN205231942 also depends on constructive changes to the electric machine housing and specific caps to exist and function, i.e., it depends on a dedicated construction that cannot be easily applied to other motors that do not have these caps and, therefore, it cannot be applied to existing motors.

Document CN205231942 does not teach or suggest the separation of impurities from the circulating air to meet specific protection requirements, remembering that air intake and exhaust occur directly through caps attached to the housing, without any screens or elements capable of changing the direction of the air and thus preventing particles from entering the motor.

Finally, the solution of CN205231942 also does not mention or suggest a solution for dampening the noise produced by the electric machine, especially by the cooling fan.

Another solution of the nature dealt with herein is that of the "VENTILATING DEVICE OF VERTICAL TYPE ROTARY ELECTRIC MACHINE" disclosed by patent document JPS5579651, which describes an airflow sucked in at the lower part and exhausted at the upper part of the electric machine.

Although the cooling circuit of JPS5579651 promotes an upward flow, the air intake and exhaust occur directly through openings in the housing, and the intake takes place along the entire circumference of the housing, i.e., just like the circuit of CN205231942, it depends on specific constructive changes, which makes it extremely difficult and even impossible to apply to other existing motors.

Document JPS5579651 also does not teach or suggest the separation of impurities from the circulating air to meet specific protection requirements, nor does it provide a solution for dampening the noise produced by the electric machine, thus having the same disadvantages as already mentioned in relation to document CN205231942.

As can be inferred from the above description, there is space and demand for a cooling solution for rotary electric machines that overcomes the disadvantages of the prior art, especially for cooling vertical rotary electric machines.

OBJECTS OF THE INVENTION

Therefore, one of the objects of the present invention is to provide an air-cooling system for vertical rotary electric machines according to the features of claim 1 of the appended set of claims.

Another object of the present invention is to provide a ventilation box dedicated to air cooling with an inverted circuit as well as particle retention and noise-dampening means for vertical rotary electric machines, according to the features of claim 7 of the appended set of claims.

Still another object of the present invention is to provide a corresponding vertical rotary electric machine according to the features of claim 8 of the appended set of claims.

Additional features and feature details are evident from the dependent claims.

BRIEF DESCRIPTION OF THE DRAWINGS

For a better understanding and visualization of the object to which the invention relates, the present invention will now be described with reference to the accompanying figures, representing the obtained technical effect by means of an exemplary embodiment without limiting the scope of the present invention, wherein, schematically.

DETAILED DESCRIPTION OF THE INVENTION

Figure 1:
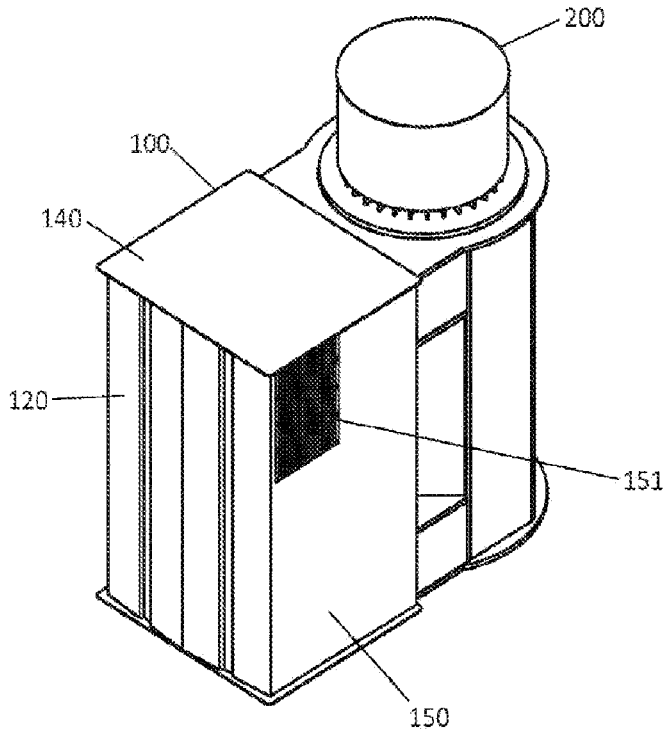
FIG. 1 shows a top isometric perspective view of a vertical rotary electric machine coupled to a ventilation box according to the invention.
Figure 2:
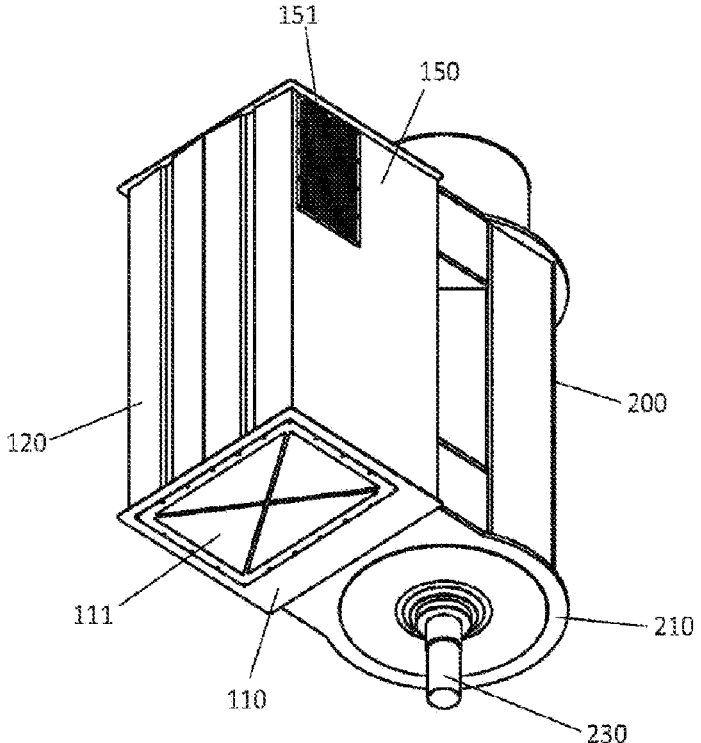
FIG. 2 shows a lower isometric perspective view of a vertical rotary electric machine coupled to a ventilation box according to the invention.
Figure 3:
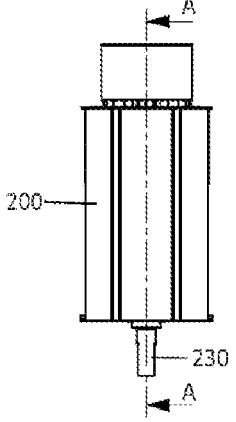
FIG. 3 shows a rear view of a vertical rotary electric machine coupled to a ventilation box according to the invention.
Figure 4:
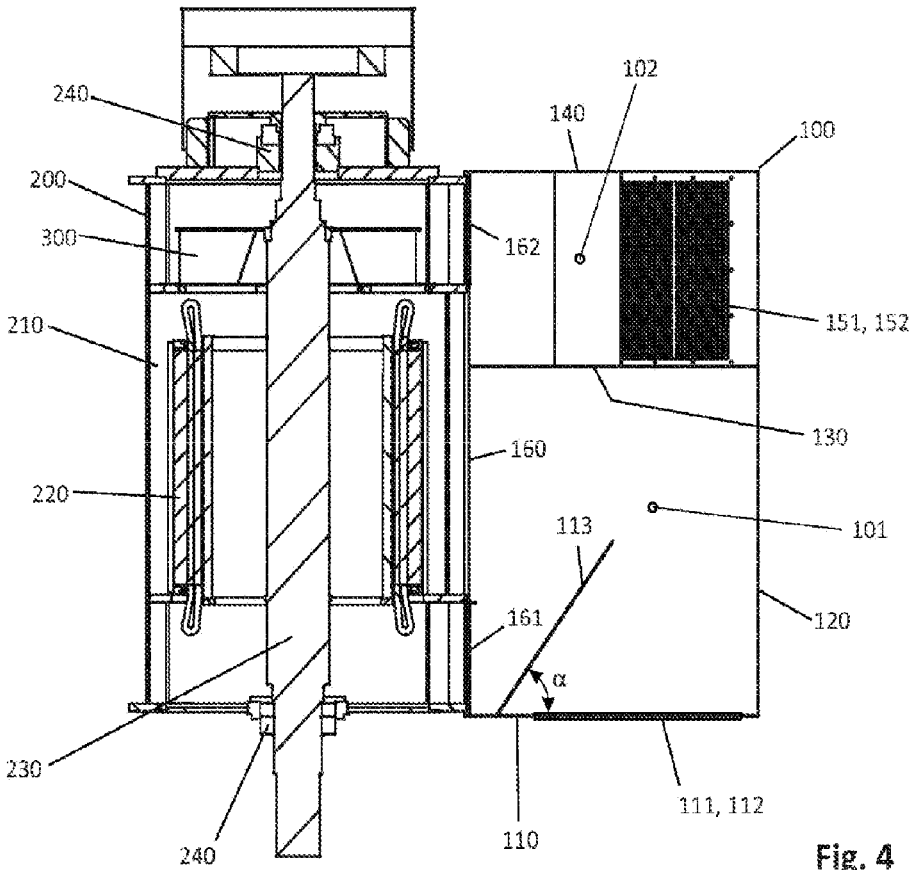
FIG. 4 shows a side view of section A-A of FIG. 3, indicating the internal components of a vertical rotary electric machine coupled to a ventilation box according to the invention.
Figure 5:
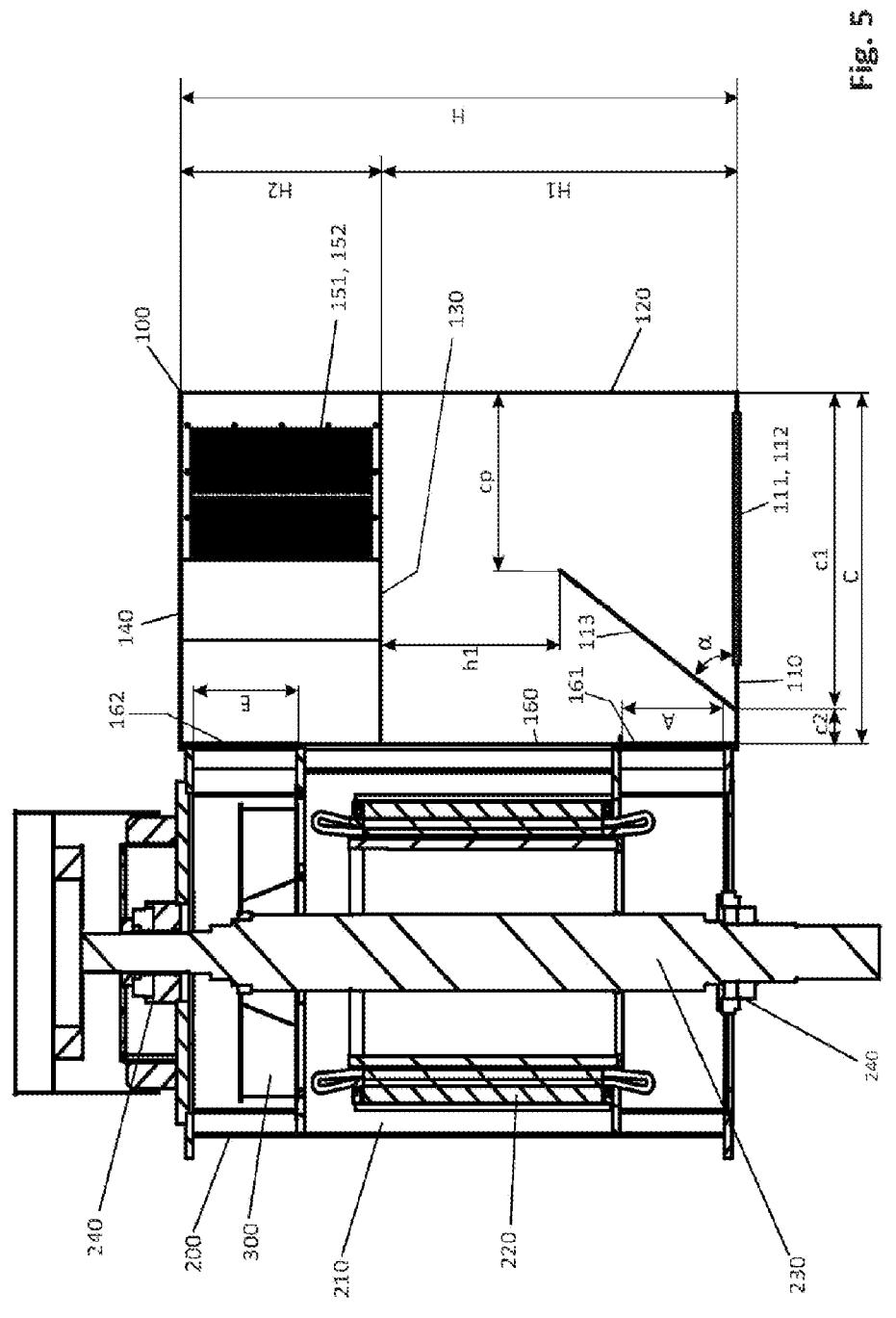
FIG. 5 shows a side view of section A-A of FIG. 3, indicating the internal components of a vertical rotary electric machine coupled to a ventilation box according to the invention.
Figure 6:
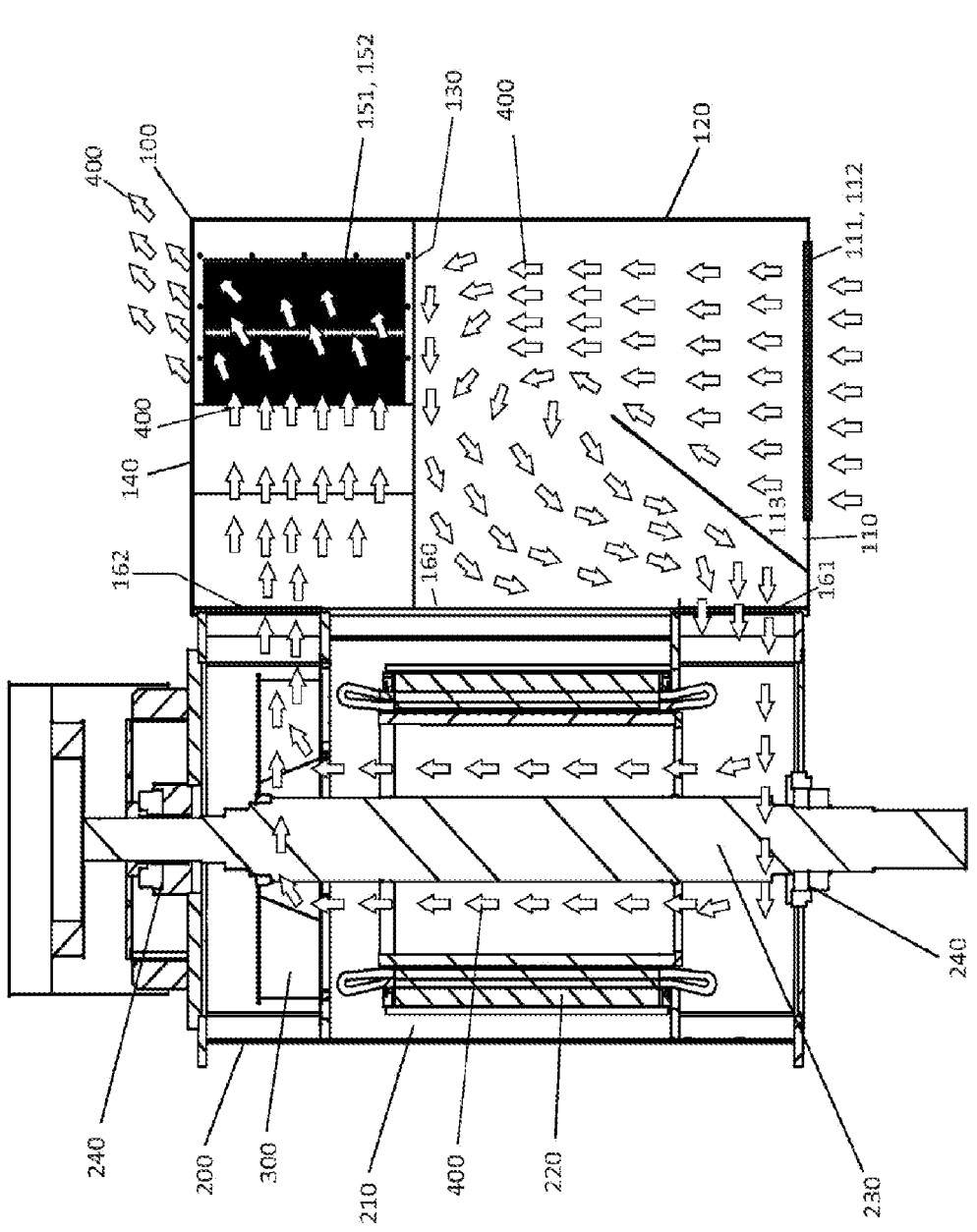
FIG. 6 shows a side view of section A-A of FIG. 3, indicating the cooling airflow according to the invention.
Figure 7:
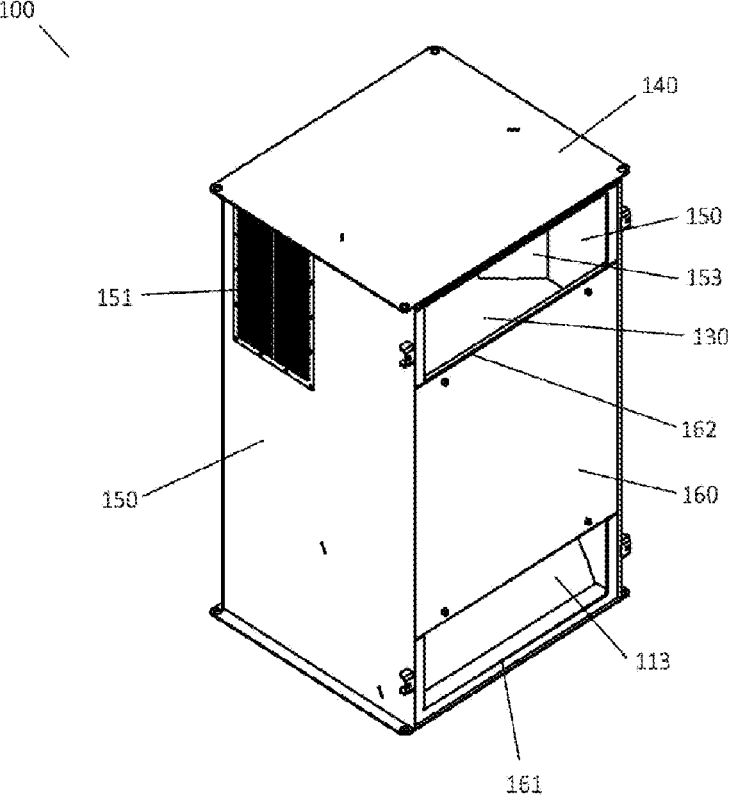
FIG. 7 shows a perspective view of a ventilation box according to the invention.
Figure 8:
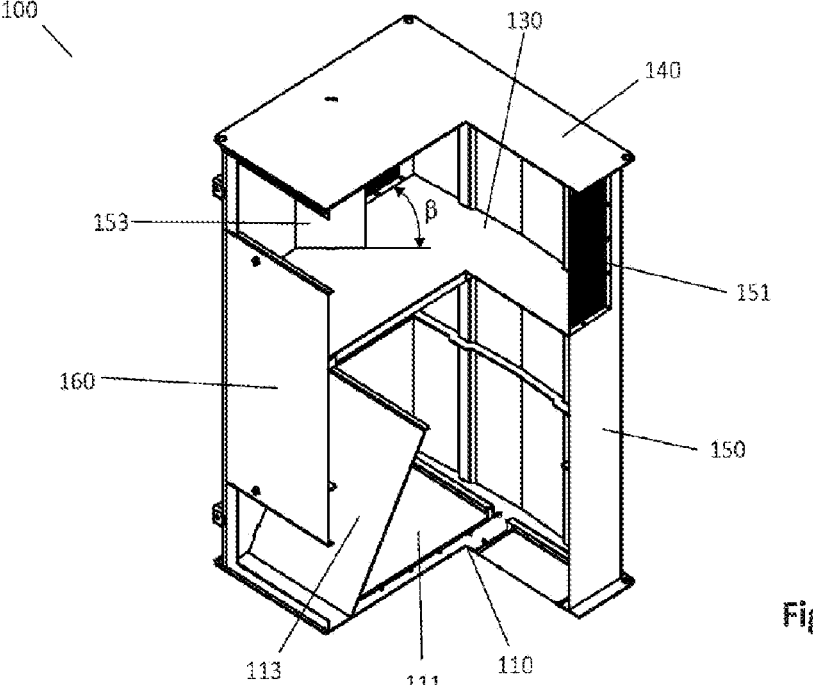
FIG. 8 shows a perspective partial cross-section view of a ventilation box according to the invention.
Figure 9:
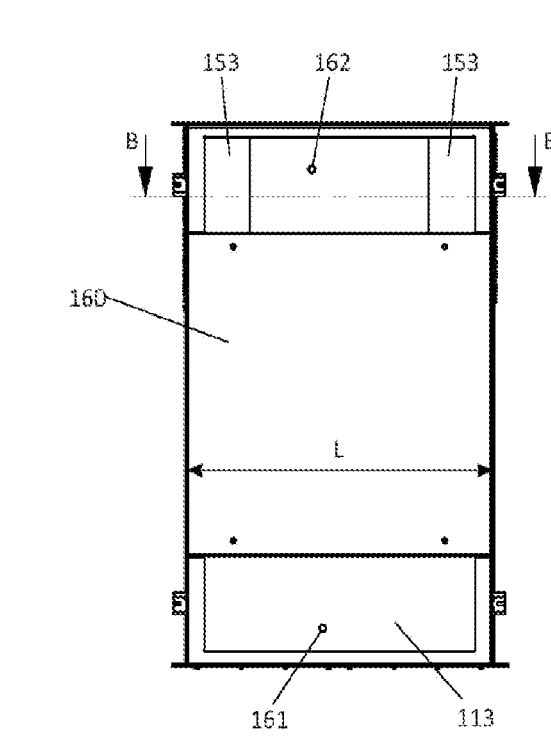
FIG. 9 shows a front view of a ventilation box according to the invention.
Figure 10:
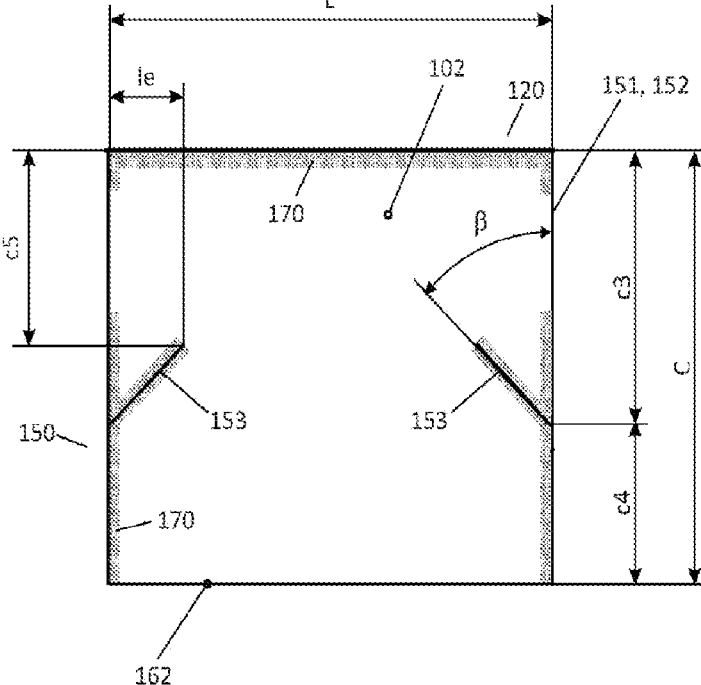
FIG. 10 shows a top view of section B-B in FIG. 9.

The present invention relates to an air-cooling system, particularly a cooling system with an upward-flow circuit as well as particle retention and noise-dampening means, comprising a ventilation box (100) coupled to a vertical rotary electric machine (200) provided with at least one fan (300), wherein the ventilation can be carried out by one or more of the fans of the ventilation circuit of the electric machine.

The ventilation box (100) consists of a modular one-piece body arranged separately from the structure of the vertical rotary electric machine (200) and that is coupled thereto externally to form the dedicated cooling circuit of the vertical rotary electric machine (200), wherein the cooling circuit has an upward flow.

The ventilation box (100) having width (L), height (H) and length (C) is a device comprising a lower wall (110), a distal wall (120), an intermediate wall (130), an upper wall (140), two side walls (150) and a proximal wall (160).

The lower wall (110) comprises an air intake (111) and at least one intake screen (113), the base of which is arranged at a distance (c1) from the distal wall (120) and at a distance (c2) from the proximal wall (160), forming an angle (a) with the lower wall (110). The air intake (111) can be a simple opening and/or include structural elements such as frames, screens, grids and the like, alone or in combination, and may also be equipped with a selective retention element (112) such as filtering elements, blankets, foams, labyrinths and the like, alone or in combination.

The angle (a) is substantially acute, i.e., preferably less than 90°. The use of angles (a) equal to or greater than 90° will depend on the specific needs of the application, sizing, air demand, protection class, etc.

The distal wall (120) is the farthest wall from the longitudinal axis of the vertical rotary electric machine (200) and runs preferably parallel to the proximal wall (160) and preferably perpendicular to the other walls (110, 130, 140, 150) and defines an intake passage distance (cp) with respect to the sloped upper end of the intake screen (113). The measurement of the intake passage distance (cp) will depend on the design as a whole, and can be, but is not limited to, a value between 40 and 70%, preferably between 55 and 60% of the distance (c1) value, while the distance (c1) corresponds to a value between 80 and 99%, preferably between 87 and 93% of the length (C) value.

The intermediate wall (130) runs preferably parallel to the lower wall (110) and upper wall (140), and is arranged therebetween at a height (H1) with respect to the lower wall (110) and at a height (H2) with respect to the upper wall (140), in which the internal space of the ventilation box (100) is divided into an intake region (101) and an exhaust region (102), defining an intake passage height (h1) with respect to the sloped upper end of the intake screen (113). The height (H1) corresponds to a value between 50 and 80%, preferably between 65 and 70% of the height (H) value.

The side walls (150) form the lateral closure of the ventilation box (100), each comprising, at its upper part or above the intermediate wall (130), at least one air outlet (151) and at least one sloped exhaust screen (153), and the base of which is arranged at a distance (c3) from the distal wall (120) and at a distance (c4) from the proximal wall (160), forming an angle (l) with the side wall (150). The distance (c3) corresponds to a value between 40 and 70%, preferably between 58 and 65% of the length (C) value. The angle (β) is substantially acute, i.e., preferably less than 90°. The use of angles (β) equal to or greater than 90° will depend on the specific needs of the application, sizing, air demand, protection class, etc.

The air outlets (151) can be simple openings and/or include structural elements such as frames, screens, grids, and the like, alone or in combination, and may also be equipped with a selective retention element (152), such as filter elements, blankets, foams, labyrinths, and the like, alone or in combination.

Each side wall (150) defines an exhaust passage width (le) with respect to the sloped upper end of the exhaust screen (153), while each distal wall (120) defines an exhaust passage distance (c5) with respect to the sloped upper end of the exhaust screen (153). The exhaust passage width (le) value corresponds to a value between 5 and 25%, preferably between 11 and 17% of the width (L) value, while the exhaust passage distance (c5) value corresponds to a value between 30 and 55%, preferably between 41 and 48% of the length (C).

The proximal wall (160) is the closest wall to the longitudinal axis of the vertical rotary electric machine (200) and runs preferably parallel to the distal wall (120) and preferably perpendicular to the other walls (110, 130, 140, 150) and has an intake opening (161) having an intake height (A) in the intake region (101), and an exhaust opening (162) having an exhaust height (E) in the exhaust region (102). The intake height (A) value corresponds to a value between 15 and 50%, preferably between 23 and 39% of the height (H1), while the exhaust height (E) value corresponds to a value between 40 and 60%, preferably between 48 and 55% of the height (H2).

A vertical rotary electric machine (200) in the context of the invention is an electric motor, which basically comprises, as known in the art, a housing (210), a stator (220), a rotor (230), and bearings (240).

In ventilation systems for electric motors of this type, the fan (300) is commonly mounted on the shaft of the rotor (230), causing a pressure difference and thus sucking external air into the electric motor and generating an airflow towards the vertical rotary electric machine (200), removing part of the heat and returning it to the external environment, as known in the art.

In a cooling system according to the invention, the airflow (400) will preferably be conducted upwards by the ventilation box (100) of the invention, which is coupled to the vertical rotary electric machine (200).

The pressure difference caused by the fan (300) will generate an airflow (400) that will force the entry of the intake air into the ventilation box (100) through the air intake (111) from the lower part of the ventilation box (100).

The airflow (400) enters the intake region (101), where a part of this airflow (400) collides with the intake screen (113) and another part with the distal wall (120), flowing in a substantially upward direction with a slight tapering, following the slope angle (a) of the intake screen (113) and passing through the intake passage distance (cp).

Part of the airflow (400) is sucked directly towards the intake opening (161) just after passing through the intake passage distance (cp) and the intake passage height (h1), while another part continues to rise and hits the intermediate wall (130) before proceeding towards the intake opening (161), the airflow (400) as a whole having a first change of direction at an angle substantially greater than 90° with respect to the previous condition.

The airflow (400) then proceeds partly directly towards the intake opening (161) and partly hits the proximal wall (160) and/or the backside of the intake screen (113) before proceeding to the intake opening (161), wherein the airflow (400) as a whole has its second change of direction at an angle substantially greater than 90° in relation to the previous condition.

The airflow (400) then proceeds to the intake opening (161), having its third change of direction at an angle substantially greater than 90° in relation to the previous condition before crossing it, thus entering the housing (210) perpendicularly to the shaft of the rotor (230), at its lower portion adjacent to the lower cap of the bearing (240).

The airflow (400) has a new change of direction, proceeding upwards towards the fan (300), flowing through the space between the stator (220) and rotor (230) and/or through channels arranged in the rotor (230) and/or the stator (220) and/or between the stator (220) and the housing (210), depending on the construction of the vertical rotary electric machine (200).

Passing through the fan (300), the airflow (400) changes its direction once more and is exhausted out of the housing (210) through the exhaust opening (162), thus returning to the ventilation box (100), specifically to the exhaust region (102), which is separated from the intake region (101) by the intermediate wall (130).

The airflow (400) proceeds towards the distal wall (120), with one part directly hitting the distal wall (120) and the other part hitting the exhaust screens (153) first, when the airflow (400) is forced to change its direction once more.

The airflow (400) then proceeds through the exhaust passage distance (c5) and the exhaust passage width (le), hitting the portions of the side walls (150) arranged behind the exhaust screens (153), in a substantially horizontal direction and with a slight tapering, following the slope angle ((3) of the exhaust screen (153), then proceeds to the air outlets (151) and returns to the external environment, leaving the ventilation box (100) from the upper part of the ventilation box (100).

All internal or inner-facing elements and parts of the ventilation box arranged in the exhaust region (102), preferably the distal wall (120), the intermediate wall (130), the upper wall (140), the side walls (150), and the leading faces (front and/or backside, in the airflow (400) direction) of the exhaust screens (153), can be coated with appropriate noise-dampening material, preferably in the form of polygonal segments (170), which can be any suitable material known in the art as long as it does not interfere with the airflow (400).

The various advantages of the ventilation box (100) according to the invention in relation to the relevant prior art should be apparent from the foregoing description.

Firstly, the ventilation box (100) consists of a modular one-piece body arranged separately from the structure of the vertical rotary electric machine (200), having a simple construction and low material and manufacturing costs, and which is versatile and can be used in various types of vertical rotary electric machines (200).

Furthermore, the arrangement of the air intake (111) at the lower part and the air outlets (151) at the upper side part, in addition to preventing recirculation, i.e., that the hot exhaust air is sucked in again, it prevents rainwater from entering the interior of the ventilation box (100).

Additionally, the various abrupt changes in direction of more than 90° of the airflow (400) traveling through the ventilation box (100), especially in the path taken in the intake region (101)—air inlet—allow specific standards as well as specific protection requirements to be met, such as protection against access to dangerous parts with a finger, protection against ingress of solid foreign objects, as well as protection against splashing water and several other special standards.

The presence of exhaust screens (153) and the possibility of coating the exhaust region (102) with suitable noise-dampening material enable a significant reduction of the noise level and, therefore, the use of virtually all kinds of fans (300), including radial blade fans which, despite being noisier than other types of fans, are bidirectional and, therefore, independent of the direction of rotation of the machine (clockwise or counterclockwise), further increasing the modularity of the inventive solution.

And the use of a simple and versatile air intake (111) and air outlets (151) enables the use of different materials and elements to, for example, control the velocity of the airflow (400), retain particles, additional noise dampening, among other possibilities.

Finally, a vertical rotary electric machine (200) according to the invention is an electric motor coupled to a ventilation box (100) according to the invention.

CONCLUSION

One skilled in the art will easily understand that modifications can be made to the present invention without departing from the concepts set out in the description above. Such modifications should be considered as comprised within the scope of the present invention. Consequently, the particular embodiments previously described in detail are merely illustrative and exemplary and are non-restrictive as to the scope of the present invention, which should be given the full extent of the appended claims and any and all equivalents thereof.

The invention claimed is:

1. An air-cooling system for vertical rotary electric machines, the air-cooling system comprising:

a one-piece, modular ventilation box arranged separately and outside a vertical rotary electric machine to form a cooling circuit in an internal space of the modular ventilation box and an internal space of the vertical rotary electric machine, wherein the internal space of the one-piece, modular ventilation box is divided into an intake region and an exhaust region, wherein the intake region comprises an air intake, an intake screen and an intake opening, wherein the exhaust region comprises an exhaust opening, an exhaust screen and an air outlet, wherein the intake region and the exhaust region are separated by an intermediate wall, wherein the vertical rotary electric machine includes a rotor and a stator, wherein the cooling circuit is configured to direct airflow from the intake opening, through the internal space of the vertical rotary electric machine, and towards the exhaust opening, with at least one change of direction within the internal space of the rotary electric machine, and wherein the airflow that passes through a space between the rotor and the stator is an upward flow.

2. The system according to claim 1, wherein the intake screen forms an acute angle ($\alpha$) with a lower wall of the ventilation box.

3. The system according to claim 1, wherein the exhaust screen is adjacent to a distal wall of the ventilation box, and wherein the exhaust screen and the distal wall define an acute angle ($\beta$).

4. The system according to claim 1, wherein the exhaust region can be coated with a noise-dampening material.

5. The system according to claim 1, wherein a sloped upper end of the intake screen defines an intake passage distance with respect to a distal wall of the one-piece, modular ventilation box and an intake passage height with respect to the intermediate wall of the one-piece, modular ventilation box.

6. The system according to claim 1, wherein a sloped upper end of the exhaust screen defines an exhaust passage width with respect to a side wall of the one-piece, modular ventilation box and an exhaust passage distance with respect to a distal wall of the one-piece, modular ventilation box.

7. The system of claim 1, wherein the ventilation box has an inverted circuit and particle retention and noise-dampening means for a vertical rotary electric machine.

8. A rotary electric machine comprising the air-cooling system of claim 1.

* * * * *